US010585676B2

(12) United States Patent
Jeansonne et al.

(10) Patent No.: US 10,585,676 B2
(45) Date of Patent: *Mar. 10, 2020

(54) AUTHORIZING A BIOS POLICY CHANGE FOR STORAGE

(71) Applicant: HEWLETT-PACKARD DEVELOPMENT COMPANY, L.P., Houston, TX (US)

(72) Inventors: Jeffrey Kevin Jeansonne, Houston, TX (US); Valiuddin Ali, Houston, TX (US); Lan Wang, Houston, TX (US); Baraneedharan Anbazhagan, Houston, TX (US); Patrick L. Gibbons, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,169

(22) Filed: Nov. 16, 2018

(65) Prior Publication Data
US 2019/0102207 A1 Apr. 4, 2019

Related U.S. Application Data

(63) Continuation of application No. 15/309,486, filed as application No. PCT/US2014/047580 on Jul. 22, 2014, now Pat. No. 10,169,052.

(51) Int. Cl.
G06F 9/445 (2018.01)
G06F 21/57 (2013.01)
(Continued)

(52) U.S. Cl.
CPC .......... *G06F 9/44505* (2013.01); *G06F 21/44* (2013.01); *G06F 21/572* (2013.01);
(Continued)

(58) Field of Classification Search
CPC .... G06F 11/1417; G06F 21/44; G06F 21/572; G06F 21/575; G06F 21/6218;
(Continued)

(56) References Cited

U.S. PATENT DOCUMENTS 5,844,986 A 12/1998 Davis
2003/0163753 A1\* 8/2003 Lu ....................... G06F 11/1417
714/2
(Continued)

FOREIGN PATENT DOCUMENTS

CN 101639877 A 2/2010
TW 200604934 A 2/2006
(Continued)

OTHER PUBLICATIONS

Cooper, D., et al., "Bios Protection Guidelines," National Institute of Standards and Technology, Special Publication 800-147, Apr. 2011, 26 pages.

(Continued)

*Primary Examiner* — Terrell S Johnson
(74) *Attorney, Agent, or Firm* — HPI Patent Department

(57) ABSTRACT

Examples herein disclose receiving a basic input output system (BIOS) policy change and authorizing the BIOS policy change. Upon the authorization of the BIOS policy change, a first copy of the BIOS policy is stored in a first memory accessible by a central processing unit. Additionally, a second copy of the BIOS policy change is transmitted for storage in a second memory electrically isolated from the central processing unit.

20 Claims, 6 Drawing Sheets

(51) Int. Cl.
*G06F 21/62* (2013.01)
*G06F 21/79* (2013.01)
*G06F 21/44* (2013.01)
*H04L 9/06* (2006.01)
*H04L 9/32* (2006.01)
*G06F 11/14* (2006.01)

(52) U.S. Cl.
CPC ........ *G06F 21/575* (2013.01); *G06F 21/6218* (2013.01); *G06F 21/79* (2013.01); *H04L 9/0643* (2013.01); *H04L 9/3242* (2013.01); *G06F 11/1417* (2013.01); *G06F 2221/2141* (2013.01)

(58) Field of Classification Search
CPC ............. G06F 21/79; G06F 2221/2141; G06F 9/44505; H04L 9/0643; H04L 9/3242
See application file for complete search history.

(56) References Cited

U.S. PATENT DOCUMENTS

2005/0021968 A1 1/2005 Zimmer et al.
2013/0117006 A1 5/2013 Varghese et al.
2014/0040605 A1* 2/2014 Futral .................... G06F 9/445 713/2
2014/0075543 A1 3/2014 Muir

FOREIGN PATENT DOCUMENTS

| | | |
|---|---|---|
| TW | 200638200 A | 11/2006 |
| TW | 200713037 A | 4/2007 |
| WO | 03003212 A2 | 1/2003 |
| WO | 2013038261 A2 | 3/2013 |

OTHER PUBLICATIONS

Trusted Execution Environment EFI Protocol, Feb. 2, 2013, Microsoft, 17 pages.

Futral, W., et al., "Intel® Trusted Execution Technology for Server Platforms," Research Paper, Sep. 26, 2013, it-ebooks.info, 149 pages.

* cited by examiner

AUTHORIZING A BIOS POLICY CHANGE FOR STORAGE

BACKGROUND

A computing system can include code to perform various startup functions of the computing device. This code may include Basic Input/Output System (BIOS) code. The BIOS code may initialize and test hardware of the computing device. Additionally, the BIOS code may load bootstrap code and/or an operating system from a memory device of the computing device.

BRIEF DESCRIPTION OF THE DRAWINGS

In the accompanying drawings, like numerals refer to like components or blocks. The following detailed description references the drawings, wherein.

DETAILED DESCRIPTION

Figure 1:
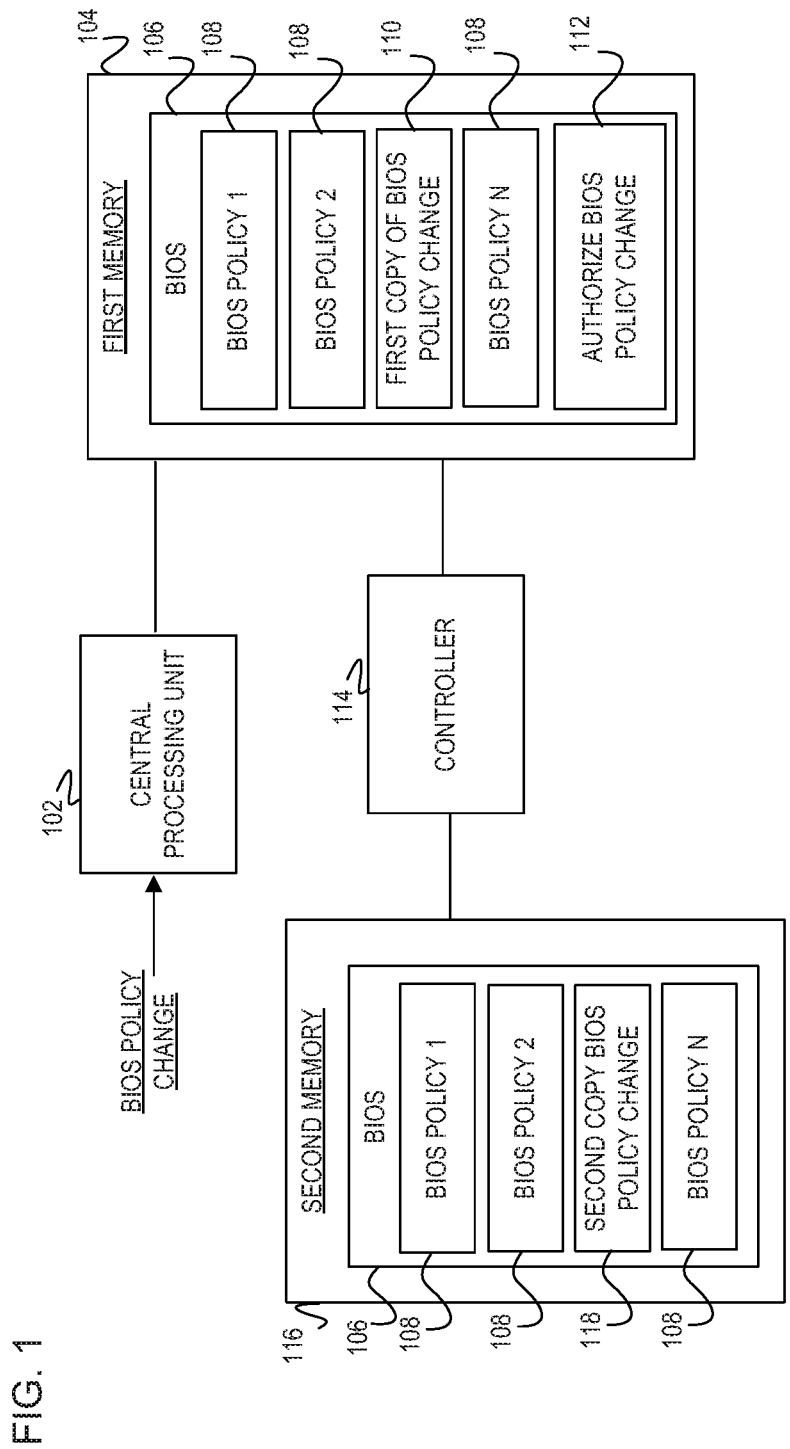
FIG. 1 is a block diagram of an example system including an authorization of basic input output system (BIOS) policy change and based on the authorization, a first copy of the BIOS policy change is stored in a first memory accessible by a central processing unit and a second copy is transmitted to a second memory isolated from the central processing unit for storage.

BIOS code may be executed to configure and test hardware within a computing device. As such, the BIOS code may include a BIOS policy which provides a guideline for controlling a configuration of the BIOS settings. The BIOS policies may include, by way of example, a boot order of the BIOS code, hardware configurations, BIOS security mechanism, or other type BIOS control settings. A BIOS policy change is a modification to at least one of these BIOS policies. These BIOS policies and/or BIOS code may be susceptible to attacks. As such, when the BIOS policy and/or code becomes corrupt, there may be no backup of the configuration changes in BIOS policies and/or code. Additionally, it may not be feasible to detect whether a change in the BIOS policy and/or code was authorized. Thus, this may lead to the computing device executing the corrupt BIOS policy and/or corrupt code. Further, the BIOS policy and/or code may be more susceptible to attacks if placed in a memory accessible by a central processing unit. This may be because many of the attackers may use the central processing unit to access the BIOS policy and/or code.

To address these issues, examples disclosed herein identify a change to a BIOS policy and detects whether the change may be authorized prior to committing the change into a memory. The examples provide upon receiving a BIOS policy change, determining whether the BIOS policy change has been authorized. If the BIOS policy change has been authorized, a copy of the BIOS policy change may be stored in a first memory accessible by a central processing unit (CPU). If it has been determined the BIOS policy change is unauthorized, the BIOS policy change is not committed to storage. Authorizing the BIOS policy change prior to committing to storage prevents corrupt and/or unauthorized BIOS policy change(s) to be executed by the CPU.

Additionally upon the authorization, an additional copy of the BIOS policy change is transmitted for storage in a second memory electrically isolated from the CPU. The first memory is considered more susceptible to a potential attack as the first memory is accessible by the CPU where attackers may try to target. Targeting the CPU, the attackers may gain access to the first memory; however, electrically isolating the second memory from the CPU protects the various BIOS policies and/or code from potential attacks. Additionally, protecting the BIOS policies and/or code in the second memory provides a mechanism to backup the various BIOS policies and/or code for preservation.

In another example discussed herein, the CPU initiates execution of the BIOS from the first memory and validates at least one of the BIOS policies in the first memory. The execution of the BIOS may occur simultaneously and/or upon determining whether the BIOS policy change has been authorized. The validation may occur through a comparison of a first value representing the BIOS policy in the first memory and a second value representing the corresponding BIOS policy in the second memory. If the values are similar, the CPU may resume execution of the BIOS as this indicates the BIOS policy in the first memory has not been tampered with and is without corruption. If the values are dissimilar, the corresponding BIOS policy in the second memory serves as backup to replace the BIOS policy in the first memory. This example enables the CPU to detect whether particular BIOS policies in the first memory have been tampered with and to proactively respond to the corrupt BIOS policies. This ensures the second memory remains a reliable source for obtaining the BIOS if the first memory may suffer any BIOS policy corruptions.

Thus, examples disclosed herein provide a secure mechanism for authorizing a BIOS policy change prior to committing the change into storage. Additionally, the examples provide a validation of a BIOS policy in a memory to detect whether the BIOS policy may be corrupt.

Referring now to the figures, FIG. 1 is a block diagram of an example computing system including a central processing unit (CPU) 102 which may access a first memory 104. The first memory 104 includes a BIOS 106 consisting of various BIOS policies (BIOS Policy 1, BIOS Policy 2, BIOS Policy N) 108. The CPU receives a BIOS policy change and may authorize this BIOS policy change at module 112. If the BIOS policy change is authorized, a first copy of the BIOS policy change 110 is placed in the first memory 104 and a second copy of the BIOS policy change 118 is transmitted to a controller 114 for storage in a second memory 116. The first memory 104 is accessible by the CPU 102 for placing the first copy of the BIOS policy change in the memory 104. Additionally, the CPU 102 may retrieve the BIOS 106 for execution. The second memory 116 provides a private storage in the sense the second memory 116 is electrically isolated from the CPU 102. Electrically isolating the second memory 116 from the CPU 102, protects the BIOS 106 and the various BIOS policies 108 within the second memory 116.

Authorizing the BIOS policy change at module 112 prior to placing in the first memory 104 and the second memory 116, enables the CPU to prevent unauthorized copies of the BIOS policy change from being stored in memories 104 and 116. This provides a secure authentication mechanism of the BIOS 106 and the various BIOS policies 108. Implementations of the CPU 102 may include, by way of example, a processor, processing unit, host processor, microprocessor, semiconductor, integrated circuit, or other type of electronic device capable of executing the BIOS 106 from the first memory 104.

The first memory 104 is a storage area within the computing device which maintains the BIOS 106 and as such, is accessible by the CPU 102. Implementations of the first memory 104 include, by way of example, read-only memory, flash memory, ferroelectric memory, ferroelectric RAM, magnetic storage memory, nanodrive, storage drive, memory component, or any combination of such memory components to maintain the BIOS 106.

The BIOS 106 includes, by way of example, BIOS code, BIOS data, and various BIOS policies 108. The BIOS 106 serves to initialize and test the hardware components within the computing system. The BIOS 106 is maintained in the first memory 104 and the second memory 116. In one implementation, the BIOS maintained in the second memory 116 serves a backup to the BIOS in the first memory 104 upon a detection of corruption and/or unauthorized changes to the various BIOS policies 108 and/or code in the first memory 104.

The various BIOS policies 108 represent different BIOS policy configurations. These BIOS policies 108 provide a configuration of the BIOS settings. The BIOS policy change is a modification to at least one of the various BIOS policies 108. In one implementation, the BIOS policy change may be a user-defined change. In this implementation, the BIOS policy change may be received by the CPU 102 locally or over a network. For example, the BIOS policy change may be generated locally by a user in which a prompt on a display of the computing device enables the user to select modification to particular BIOS policies. In another example, the BIOS policy change may be received over the network which may include a request from an administrator from a remote location.

The first copy of the BIOS policy change 110 is placed in the first memory 104 upon the authorization of the BIOS policy change at module 112. The first copy of the BIOS policy change 110 includes the BIOS code and/or data which may be used by the CPU 102 for execution.

At module 112, the CPU may determine whether the BIOS policy change has been authorized. The authorization mechanisms may include, by way of example: inputting a password; using credentials associated with the CPU 102 and/or computing device; a cryptographic algorithm in which the BIOS policy change may be represented as a hash value and the computing device and/or CPU 102 may have a device specific decryption key to decrypt the hash value; and a key-hash authentication code (HMAC). Although FIG. 1 illustrates the first memory 104 as authorizing the BIOS policy change at module 112, this was done for illustration purposes rather than for limiting implementations. For example, the BIOS policy change may be authorized by different components within the computing system. In an example, the CPU 102 may authorize the BIOS policy change upon receiving the BIOS policy change. In another example, the controller 114 may authorize the BIOS policy change. In a further example, another component such as an I/O controller may authorize the BIOS policy change. Implementations of the module 112 include an instruction, set of instructions, process, operation, logic, technique, function, firmware, and/or software executable by a computing device and capable of determining whether the BIOS policy change is authorized.

The controller 114 is a hardware component which may receive the second copy of the BIOS policy change 118 upon the authorization of the BIOS policy change at module 112. The controller 114 is considered the hardware component with access to the second memory 116. As such, upon receiving the second copy of the BIOS policy change 118, the controller 114 stores the second copy 118 in the second memory 116. In one implementation, the controller 114 authorizes the BIOS policy change at module 112 rather than the CPU 102. In this implementation, the controller 114 operates as a gatekeeper of determining whether to store the BIOS policy change in the second memory 116. Implementations of the controller 114 may include, by way of example, an embedded controller, microcontroller, semiconductor, electronic device, microchip, chipset, or other type of hardware component capable of access to the BIOS 106 in the second memory 116.

The second memory 116 is a storage area within the computing system which maintains the BIOS 106 and is electrically isolated from the CPU 102. In this manner, the CPU 102 is without access to the second memory 102. As such, for accessing and/or storing the BIOS code and/or policy within the second memory 116, requests are passed through to the controller 114. In one implementation, if upon execution, the CPU 102 detects one of the various BIOS policies 108 and/or BIOS code within the first memory 104 is corrupt, the corresponding various BIOS policy 108 and/or BIOS code within the second memory 116 is used to replace the corrupt BIOS policy and/or BIOS code in the first memory 104. The various BIOS policies 108 and/or BIOS code in the first memory 104 corresponds to the various BIOS policies and/or BIOS code in the second memory 116 in the sense the policies and/or code may be similar or analogous in function, purpose, and/or amount to the portion of the BIOS 106. In this manner, the BIOS 106 maintained in the second memory 116 serves as the backup BIOS to the BIOS 106 in the first memory 104. In a further implementation, the CPU 102 may validate a specific BIOS policy in the first memory 104 through a comparison of a first value representing the specific BIOS in the first memory 104 and a second value representing the corresponding BIOS policy in the second memory 116. In this implementation, if the CPU 102 invalidates the specific BIOS policy in the first memory 104, the corresponding BIOS policy from the second memory 116 is used to replace the specific BIOS policy in the first memory 104. This implementation is discussed in detail in a later figure. Implementations of the second memory 116 include, by way of example, read-only memory, flash memory, ferroelectric memory, ferroelectric RAM, magnetic storage memory, nanodrive, storage drive, memory component, or any combination of such memory components to maintain the BIOS 106.

The second copy of the BIOS policy change 118 is transmitted to the controller 114 upon the authorization of the BIOS policy change at module 112. The second copy of the BIOS policy change 118 includes the BIOS code and/or data corresponding to the BIOS policy change received by the CPU 102. Although FIG. 1 illustrates two copies of the BIOS policy change 110 and 118, this was done for illustration purposes as there may be three copies, four copies, etc.

Figure 2:
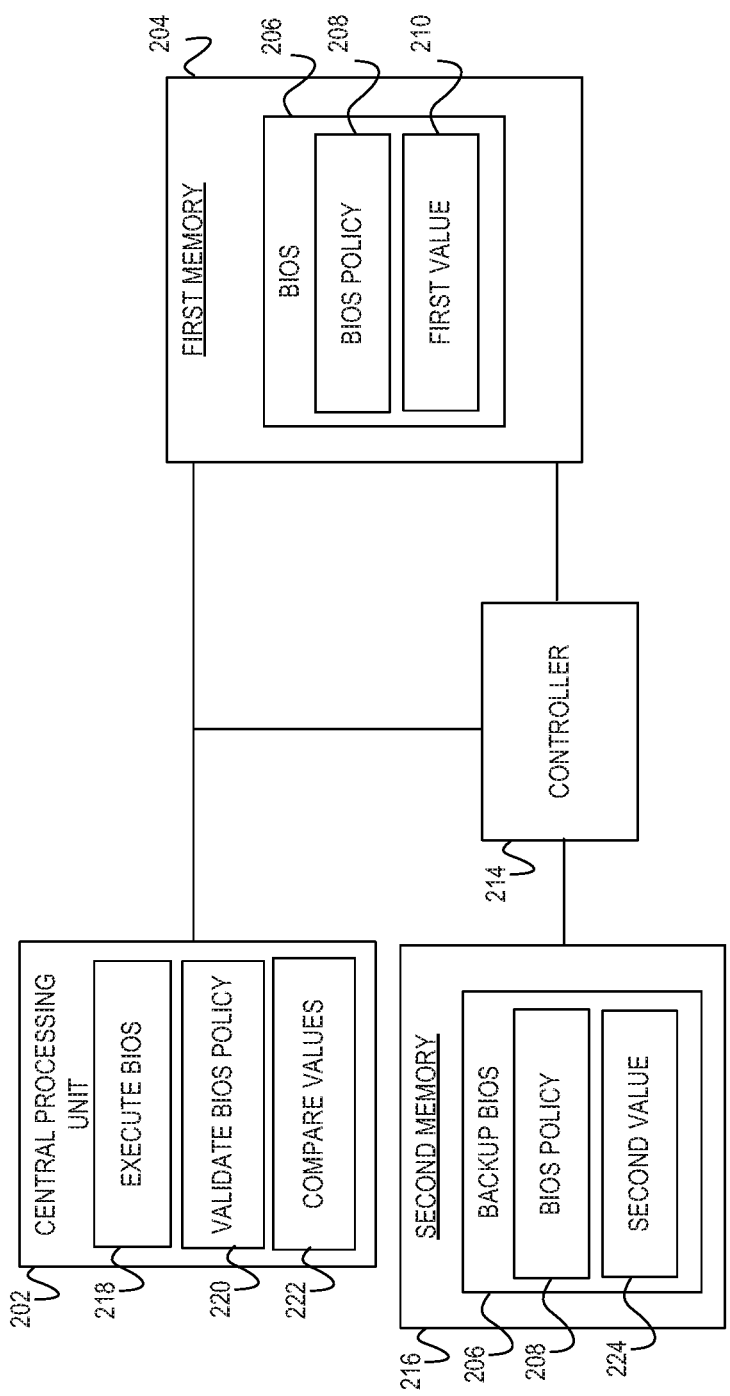
FIG. 2 is a block diagram of example system including a central processing unit to initiate an execution of BIOS, validate the BIOS through a comparison of a first value corresponding to a BIOS policy in a first memory and a second value corresponding to a BIOS policy in a second memory.

FIG. 2 is a block diagram of an example computing system including a central processing unit (CPU) 202 to initiate an execution of a BIOS 206 in a first memory 204 at module 218. When executing the BIOS 206 at module 218, the CPU 202 validates a BIOS policy 208 at module 220. The CPU 202 validates the BIOS policy 208 at module 220 by comparing a first value 210 corresponding to the BIOS policy 208 in the first memory 204 and a second value 224 corresponding to the BIOS policy 208 in a second memory 216. If the validation fails or is invalidated at module 222, the corresponding BIOS policy 208 in the second memory 216 is retrieved by the controller 214 to replace the invalidated BIOS policy 208 in the first memory 204. The first value 210 and the second value 224 are values which represent the BIOS policy 208 within the first memory 204 and the BIOS policy 208 within the second memory 216, respectively. As such, the first value 210 and the second value 224 may include, by way of example, a hash value, checksum, hash code, or other type of value representative of the respective BIOS policies 208. Using values to represent the BIOS policies 208 in the first and the second memory 204 216, reduces an amount of data being sent between the controller 214 and the CPU 202 as the value(s) are calculated for each of the BIOS policies 208 for representation purposes. The CPU 202 and the first memory 204 may be similar in structure and functionality to the CPU 102 and the first memory 104 as in FIG. 1. The BIOS 206 and the BIOS policy 208 may be similar in functionality to the BIOS 106 and the various BIOS policies 108 as in FIG. 1. Additionally, although FIG. 2 illustrates the single BIOS policy 208 in the first memory 204 and the second memory 216, this was done for illustration purposes as there may be multiple BIOS policies as in FIG. 1. Further, the controller 214 and the second memory 216 may be similar in structure and functionality to the controller 114 and the second memory 116 as in FIG. 1.

At module 218, the CPU 202 retrieves the BIOS 206 for initiating the execution of the BIOS. At module 218, the CPU 202 loads bootstrap data of the BIOS 206 to initiate the execution. In one implementation, the BIOS 206 may include a BIOS policy change as in FIG. 1 as part of the BIOS 206 in both the first memory 204 and the second memory 216. Implementations of module 218 include, by way of example, an instruction, set of instructions, process, operation, logic, technique, function, firmware, and/or software executable by the CPU 202 for executing the BIOS 206 from the first memory 204.

At module 220 upon executing the BIOS 206, the CPU 202 validates the BIOS policy 208. The CPU 202 retrieves the BIOS 206 from the first memory 204 including the BIOS policy 208 from the first memory 204. In one implementation of module 220, the CPU 202 may proceed to module 222 to compare the first value 210 and the second value 224 to validate or invalidate the BIOS policy 208 in the first memory 204. Implementations of module 220 include, by way of example, an instruction, set of instructions, process, operation, logic, technique, function, firmware, and/or software executable by the CPU 202 for validating the BIOS policy 208 from the first memory 204.

At module 222, the CPU 202 validates the BIOS policy 208 by comparing the first value 210 representing the BIOS policy 208 in the first memory 204 and the second value 224 representing the corresponding BIOS policy 208 in the second memory. In one implementation of module 222, the CPU 202 calculates the value representing the first value 210, such as the first hash value. In another implementation of module 222, the first value 210 may include a checksum value for checking the integrity of the BIOS policy 208 in the first memory 204.

To obtain the second value 224 at module 222, the CPU 202 may transmit a request to the controller 214 to retrieve the second value 224 and/or the corresponding BIOS policy 208 from the second memory 216. In another implementation, the CPU 202 obtains the corresponding BIOS policy 208 from the second memory 216 and calculates the value representing the second value 224. If the values mismatch at module 222, this indicates tampering with a copy of the BIOS policy 208 in the first memory 204. Accordingly, the corresponding BIOS policy 208 is recovered from the second memory 216 and used to replace the corrupt BIOS policy 208 in the first memory 204. If the values match or are similar at module 222, the CPU 202 may resume execution of the BIOS 206 from the first memory 204. If the values are similar at module 222, this indicates the BIOS policy 208 in the first memory 204 has not been tampered with and thus is without corruption. Implementations of module 222 include, by way of example, an instruction, set of instructions, process, operation, logic, technique, function, firmware, and/or software executable by the CPU 202 for comparing the values 210 and 224.

The first value 210 is a representation of the value corresponding to the BIOS policy 208 in the first memory 204. The first value 210 is used to map the data in the BIOS policy 208, with differences in the various BIOS policies produces different values. Thus the first value 210 and the second value 224 are used to differentiate between the BIOS policies 208 in the first memory 204 and the second memory 216, respectively. As explained earlier, upon retrieving the data of the BIOS policy 208 from the first memory 204, the CPU 202 calculate the first value 210 from the first memory 204 for validation of the BIOS policy 208 in the first memory 204. Implementations of the first value 210 include, by way of example, hash value, hash code, hash sum, checksum, hash, or other type of value representing the BIOS policy 208 in the first memory 204.

The second value 224 is a representation of the value corresponding to the data in the BIOS policy 208 within the second memory 216. The CPU 202 may obtain the second value 224 as through the controller 214 and/or by obtaining the corresponding BIOS policy 208 and then calculating the second value 224. Implementations of the second value 2224 include, by way of example, hash value, hash code, hash sum, hash, checksum, or other type of value representing the BIOS policy 208 in the second memory 216.

Figure 3:
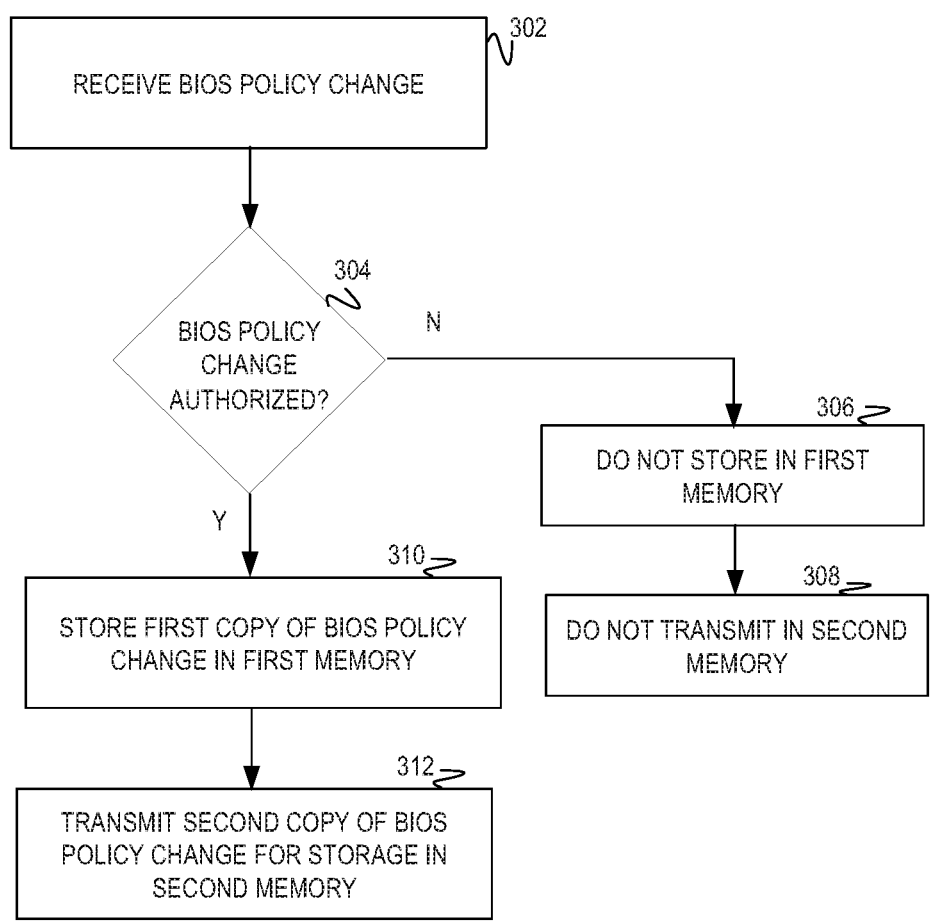
FIG. 3 is a flowchart of an example method to receive a BIOS policy change for authorization and depending on the authorization of the BIOS policy change, the method stores a first copy of the BIOS policy change in a first memory and transmits a second copy of the BIOS policy change for storage in a second memory.

FIG. 3 is a flowchart, executable by a computing device, for receiving a BIOS policy change and authorizing the BIOS policy change. Depending on whether the authorization of the BIOS policy change is successful, the computing device may proceed to store a first copy of the BIOS policy change in a first memory accessible by a central processing unit (CPU). Additionally, if the authorization of the BIOS policy change is successful, the computing device may transmit a second copy of the BIOS policy for storage at a second memory which is electrically isolated from the CPU. If the authorization of the BIOS policy change fails, the computing device does not store the BIOS policy change in the first memory or the second memory. In discussing FIG. 3, references may be made to the components in FIGS. 1-2 to provide contextual examples. For example, the CPU 102 as in FIG. 1 executes operations 302-312 to authorize the bios policy change, store the first copy of the BIOS policy change, and transmit the second copy of the BIOS policy change for storage. In another example, a computing device executes operations 302-312. Further, although FIG. 3 is described as implemented by the central processing unit, it may be executed on other suitable components. For example, FIG. 3 may be implemented in the form of executable instructions on a machine-readable storage medium 604 as in FIG. 6.

At operation 302, the CPU may receive the BIOS policy change. The BIOS policy change, by way of example, may be received by the CPU locally or may be received over a network. For example, the BIOS policy change may be generated locally by a user in which a prompt on a display of the computing device enables the user to select modification to particular BIOS policies. In another example, the BIOS policy change may be received over the network which may include a request from an administrator from a remote location. In one implementation upon receiving the BIOS policy change, the CPU may categorize the change according to whether the change is critical and sensitive or may involve non-sensitive operation policies. In this implementation, the CPU may analyze the BIOS code as part of the BIOS policy change. The critical and sensitive type of BIOS policy change may include those changes involving security and other such operational changes in the BIOS which is critical to the functioning and operation of the BIOS. For example, a critical type of BIOS policy change may involve the BIOS policy secure boot. The non-sensitive type of operation BIOS policy change may involve the type of operations in which the BIOS remains operational. For example, this may include ownership and/or display string of data which may appear upon the execution of the BIOS. If the CPU determines the BIOS policy change involves a critical and sensitive operation, the CPU may then proceed to operation 304 to determine whether the BIOS policy change is authorized. If the CPU determines the BIOS policy change involves a non-critical and non-sensitive type of BIOS policy, the CPU may commit the change to the first memory but does not commit the change to the second memory. This ensures that the BIOS policy changes are committed to the second memory upon the authorization.

At operation 304, the CPU may determine whether the BIOS policy change received at operation 302 may be authorized. The mechanisms for authorizing the BIOS policy change may include, by way of example: a physical presence of a user in which a prompt on a screen may elicit user input to ensure the change is requested; inputting a password; using credentials associated with the CPU and/or computing device; a cryptographic algorithm in which the BIOS policy change may be represented as a hash value and the computing device and/or CPU may have a device specific decryption key to decrypt the hash value; and a key-hash authentication code (HMAC). If the CPU determines the BIOS policy change has not been authorized (i.e., unauthorized), the CPU may proceed to operations 306-308. Upon determining the BIOS policy change is authorized, the CPU may proceed to operations 310-312 to store a copy of the BIOS policy change in the first memory and transmit an additional copy of the BIOS policy change to a controller which may place the additional copy in the second memory.

At operation 306, upon determining the BIOS policy change is unauthorized at operation 304, the CPU does not store the BIOS policy change in the first memory. Not allowing the unauthorized BIOS policy change for storage controls which BIOS policy changes may be stored. This provides security in the sense that the CPU selects which BIOS policies and/or code may be stored in the first memory.

At operation 308, upon determine the BIOS policy change is unauthorized at operation 304, the CPU does not transmit the BIOS policy change for storage in the second memory. The second memory is isolated from the CPU, which provides additional security to the BIOS policies and/or code which is stored in the second memory.

At operation 310, upon determining the BIOS policy change is authorized at operation 304, the CPU may produce the first copy of the BIOS policy change for storage at the first memory. The CPU may generate two or more copies of the BIOS policy change for storage in the first memory and the second memory, respectively. The CPU may have access to the first memory, unlike the second memory, thus the CPU may directly access the first memory for storing the authorized BIOS policy change. In another implementation, the CPU may calculate a value representative of the authorized BIOS policy change in the first memory. This allows the CPU to check the integrity of the BIOS policy and/or code when executing the BIOS from the first memory. This implementation may be discussed in a later figure.

At operation 312, the CPU transmits an additional copy (i.e., the second copy) of the BIOS policy change to the second memory to a controller. The controller, by way of example, may include an embedded controller which has access to the second memory. Thus as explained earlier, since the second memory is electrically isolated from the CPU, the CPU transmits to the embedded controller what should be stored.

Figure 4:
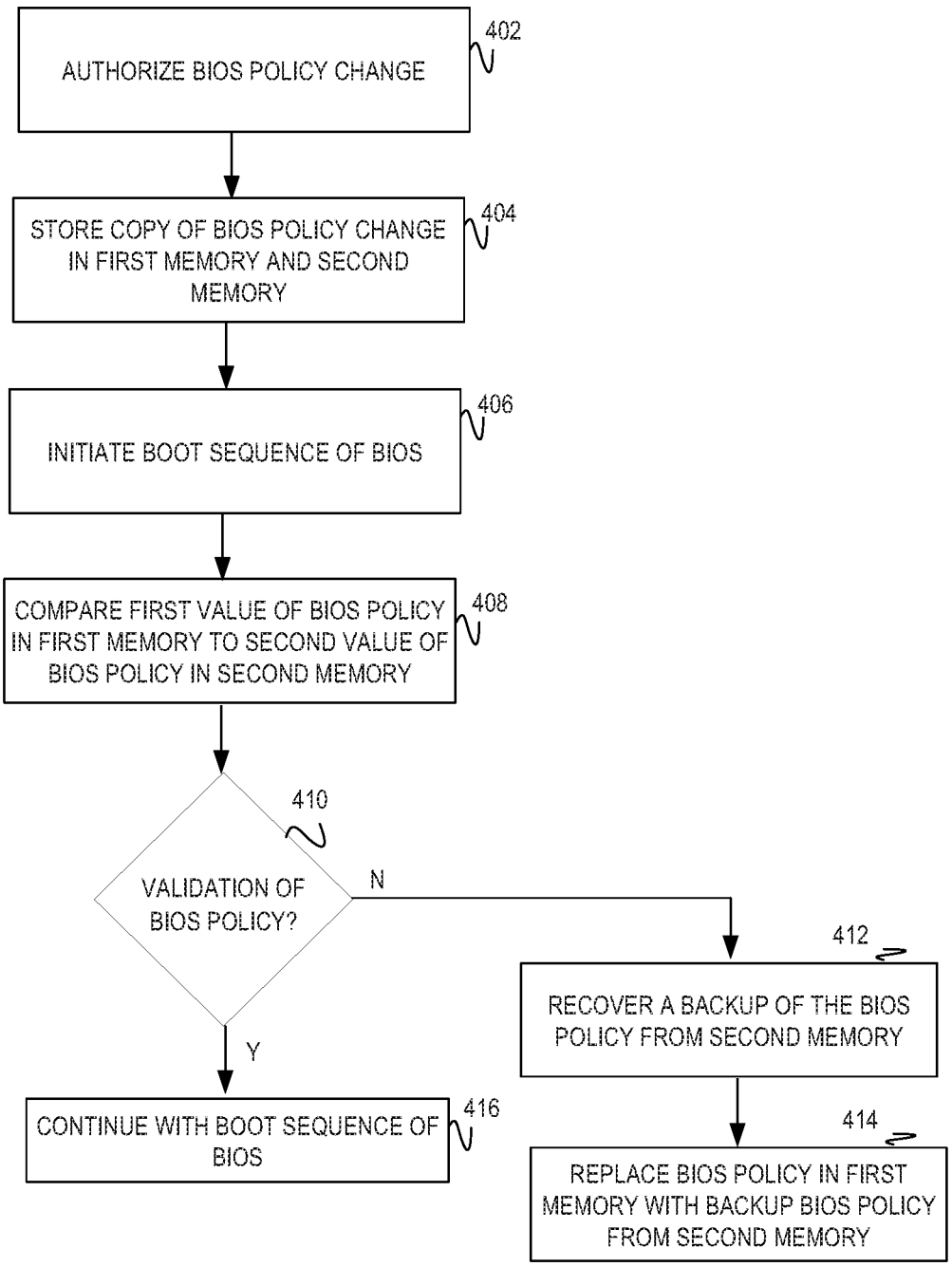
FIG. 4 is a flowchart of an example method to initiate a boot sequence of BIOS and validate a BIOS policy through a comparison of a first value of a BIOS policy in a first memory and a second value of a BIOS policy in a second memory, upon a failure of the validation, the method replaces the BIOS policy in first memory with the backup copy from the second memory.

FIG. 4 is a flowchart, executable by a computing device, for initiating a boot sequence of BIOS and validating a BIOS policy through a comparison of a first value and a second value. The first value is a representation corresponding to a BIOS policy in a first memory and the second value is a representation corresponding to a BIOS policy in the second memory. The computing device compares these values to determine whether the BIOS policy in the first memory may be corrupt. This enables the computing device to detect an unauthorized and/or invalidated BIOS policy within the first memory. In this implementation, the computing device compares the first value and the second value for determining whether the BIOS policy in the first memory is valid. If the validation is successful, the computing device may proceed to continue execution of the boot sequence of the BIOS. If the validation fails, the computing device obtains a copy of a backup BIOS policy from the second memory and replaces the BIOS policy in the first memory with the backup copy of the BIOS policy in the second memory. The second memory serves as the secure memory to override particular BIOS policies and/or code in the first memory. In this manner, the second memory serves as a private memory in the sense the second memory is electrically isolated from a central processing unit (CPU) of the system. As such, this provides protection in the second memory against tampering of the BIOS policy. In discussing FIG. 4, references may be made to the components in FIGS. 1-2 to provide contextual examples. For example, the central processing unit 102 executes operations 402-416 to validate the BIOS policy through the comparison of the first value corresponding to the BIOS policy in the first memory and a second value corresponding to the BIOS policy in the second memory. In another example, a computing device executes operations 402-416. Further, although FIG. 4 is described as implemented by the central processing unit, it may be executed on other suitable components. For example, FIG. 4 may be implemented in the form of executable instructions on a machine-readable storage medium 604 as in FIG. 6.

At operation 402, the CPU authorizes a received BIOS policy change. If the authorization of the BIOS policy change is successful, the CPU may proceed to operation 404. If the authorization fails, the CPU does not store a copy of the BIOS policy change in the first memory or second memory. In one implementation, the CPU may initiate the execution of the BIOS code prior to receiving and authorizing the BIOS policy change at operations 402-404. Operation 402 may be similar in functionality to operation 304 as in FIG. 3.

At operation 404, the CPU produces at least two copies of the authorized BIOS policy change. The first copy is stored in the first memory which is accessible by the CPU and the second copy is transmitted to a controller. The controller may place the second copy of the BIOS policy change in the second memory, not accessible to the CPU. In one implementation, the second copy is encrypted prior to storage in the second memory. This implementation is discussed in detail in a later figure. Operation 404 may be similar in functionality to operations 310 and 312 as in FIG. 3.

At operation 406, the CPU initiates the boot sequence of the BIOS. The CPU has access to the first memory and may retrieve the BIOS code from the first memory for execution. Prior to executing each BIOS policy and/or BIOS code, the CPU may perform a check for validating whether that particular BIOS policy and/or BIOS code has been tampered with at the first memory. In this manner, the CPU verifies the integrity of the particular BIOS policy and/or code.

At operation 408, the CPU compares the first value corresponding to the BIOS policy in the first memory and the second value corresponding to the BIOS policy in the second memory. Additionally at operation 408, to obtain the first value, the CPU may compute the first value representing the BIOS policy in the first memory. Further, the second value may be stored with the corresponding BIOS policy in the second memory or the second value may be calculated by the CPU. As such, at operation 408, the CPU may request this value from the controller or the CPU may request the corresponding BIOS policy for calculating the second value. As explained earlier, the first value and the second value are representations of the BIOS policy stored in the first memory and the second memory, respectively. As such, these values may include, by way of example, a hash value, hash code, hash sum, checksum, etc. The second value is the value representative of the corresponding BIOS policy stored in the second memory. The second value provides a control mechanism in which to analyze the first value against. The second value may be stored with the corresponding BIOS policy in the second memory. In this example, since the second memory is electrically isolated from the CPU, the CPU requests the second value from the controller which may access the second memory. If the values are similar, then the validation is considered successful and the BIOS policy in the first memory is considered to be without tampering or corruption. If the values are dissimilar, this indicates the BIOS policy in the first memory has undergone an unauthorized change and as such may be corrupt. For example, if the values mismatch this indicates tampering with the BIOS policy in the first memory. Comparing the values for validation at operation 410 enables the CPU to measure or check the integrity of the BIOS policies and/or code at the first memory.

At operation 410, depending on the outcome of the comparison of both values, the BIOS policy in the first memory may be considered validated. If the values are similar, this indicates the validation of the BIOS policy is successful while if the values mismatch may indicate the failure of the validation. In this manner, the CPU may detect an unauthorized intrusion or change of the BIOS policy in the first memory. If the validation of the BIOS policy fails (i.e., unsuccessful), the CPU may request the backup of the BIOS policy from the controller with access to the second memory. The CPU may use this backup BIOS policy to replace the corrupt BIOS policy in the first memory as at operations 412-414. If the BIOS policy is validated, this indicates the BIOS policy in the first memory has not been attacked and may be a trustworthy BIOS policy for execution by the CPU. If the validation of the BIOS policy is successful, the CPU may proceed to operation 416.

At operation 412, the CPU recovers the backup BIOS policy from the second memory for replacing the BIOS policy in the first memory. At operation 412, the CPU requests a copy of the backup BIOS policy. Upon receiving the backup copy of the BIOS policy, the CPU replaces the BIOS policy in the first memory that failed validation with the backup copy of the BIOS policy.

At operation 414, the CPU replaces the BIOS policy in the first memory with the backup copy of the BIOS policy obtained at operation 412. Detecting the corrupt BIOS policy from the first memory upon the failure of the validation, the backup BIOS policy may override the corrupt BIOS policy so the CPU may execute uncorrupt BIOS policies and/or code from the first memory.

At operation 416, upon the successful validation of the BIOS policy at operation 410, the CPU continues with the initiation of the boot sequence of the BIOS from the first memory. In another implementation, the CPU may hold off on the execution of the BIOS until receiving the successful validation. The CPU may then resume execution of the BIOS from the first memory.

Figure 5:
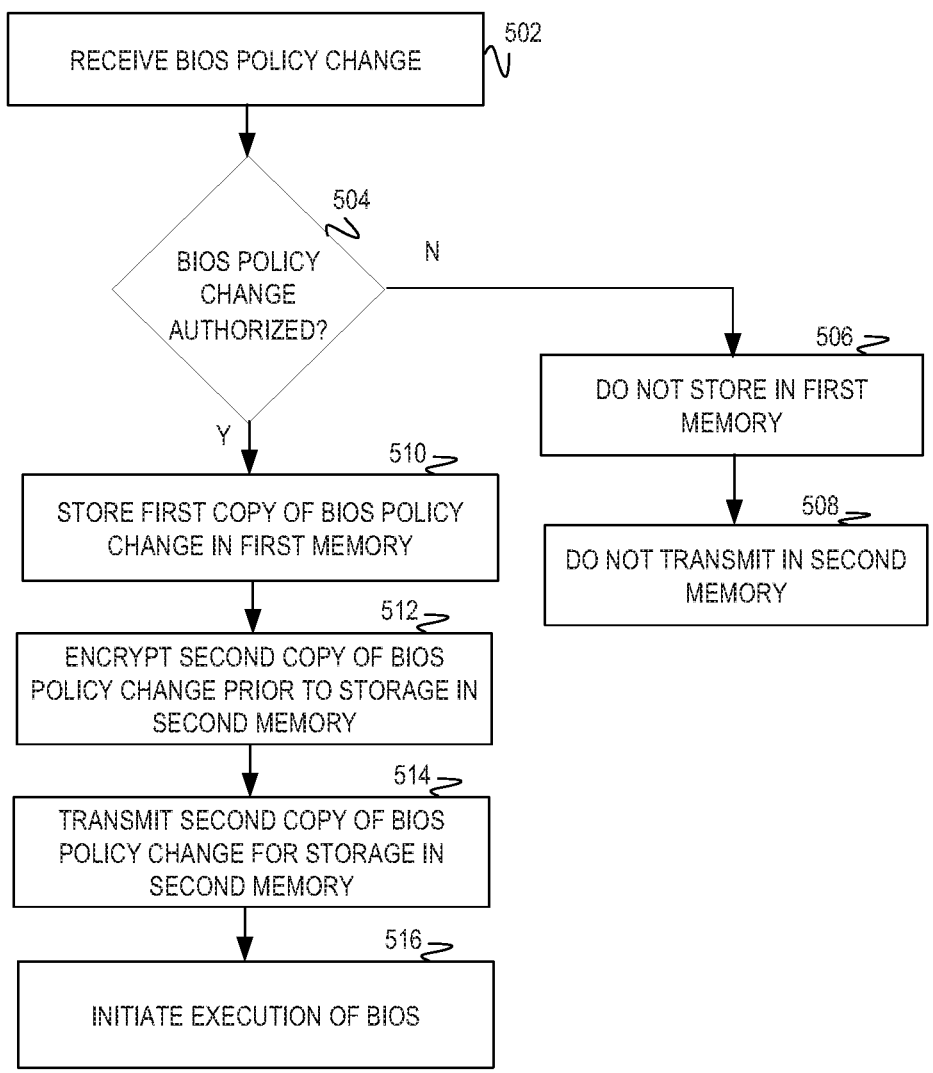
FIG. 5 is a flowchart of an example method for authorizing a BIOS policy change and storing a first copy in a first memory and encrypting a second copy of the BIOS policy change prior to storage in a second memory.

FIG. 5 is a flowchart, executable by a computing device, for authorizing a BIOS policy change and storing a first copy of the BIOS policy change in a first memory accessible by a central processing unit (CPU). A second copy of the BIOS policy change may also be encrypted prior to storage in a second memory electrically isolated from the CPU. Encrypting the second copy of the BIOS policy change prior to storage in the second memory provides an additional security mechanism to prevent corruption of the second copy of the BIOS policy change. This ensures the second memory remains a reliable source for obtaining the BIOS if the first memory may suffer any BIOS policy corruptions. In discussing FIG. 5, references may be made to the components in FIGS. 1-2 to provide contextual examples. For example, the central processing unit 102 executes operations 502-516 to authorize the bios policy change and encrypt the second copy of the BIOS policy change prior to storage in the second memory. In another example, a computing device executes operations 502-516. Further, although FIG. 5 is described as implemented by the CPU, it may be executed on other suitable components. For example, FIG. 5 may be implemented in the form of executable instructions on a machine-readable storage medium 604 as in FIG. 6.

At operation 502, the CPU receives the BIOS policy change. In one implementation, the computing device associated with the CPU may include a user interface in which a user may input the BIOS policy change. In another implementation, the BIOS policy change may be received as a remote request from over a network. In this implementation, an administrator may request to the BIOS policy change from a remote location. Operation 502 may be similar in functionality to operation 302 as in FIG. 3.

At operation 504, the CPU authorizes the BIOS policy change. The mechanisms for authorizing the BIOS policy change may include, by way of example: manually through a physical presence in which a prompt on a screen may elicit user input to ensure the change is requested; inputting a password; using credentials associated with the CPU and/or computing device; a cryptographic algorithm in which the BIOS policy change may be represented as a hash value and the computing device and/or CPU may have a device specific decryption key to decrypt the hash value; and a key-hash authentication code (HMAC). If the authorization of the BIOS policy change is unsuccessful (i.e., fails), then the CPU proceeds to operations 506-508 and does not store the BIOS policy change in the first memory or the second memory. If the authorization is unsuccessful, this may indicate an unauthorized BIOS policy change and as such may be considered corrupt. Thus, implementing the authorization of the BIOS policy change prevents unauthorized policy changes from being stored in the memories. If the authorization of the BIOS policy change is successful, the CPU may proceed to operation 510 and stores the first copy of the BIOS policy change in the first memory. Additionally, upon the authorization of the BIOS policy change, the CPU may produce the first copy and the second copy of the BIOS policy change for storage in the first and second memories, respectively. Operation 504 may be similar in functionality to operations 304 and 402 as in FIGS. 3-4.

At operation 506, upon the failure of authorization of the BIOS policy change, the CPU does not store the BIOS policy change in the first memory. This ensures the BIOS policy change is stored when authorized and thus provides a way of controlling which BIOS policy changes may be stored. Operation 506 may be similar in functionality to operation 306 as in FIG. 3.

At operation 508, upon the failure of the authorization of the BIOS policy change, the CPU does not store the BIOS policy change in the second memory. The second memory is considered isolated from the CPU and as such, provides a level of protection by isolating this memory and BIOS policies and/or codes. Operation 508 may be similar in functionality to operation 308 as in FIG. 3.

At operation 510, upon the authorization of the BIOS policy change, the CPU may transmit the first copy of the BIOS policy change for storage in the first memory. In one implementation, an I/O controller may receive the first copy of the BIOS policy change and place into the first memory. The CPU may access the first memory to retrieve a copy of the BIOS from the first memory for potential execution. Upon placing the first copy of the BIOS policy change in the first memory, the CPU may proceed to operations 512-514 to transmit an encrypted copy of the BIOS policy change for storage at the second memory. Operation 510 may be similar in functionality to operations 310 and 404 as in FIGS. 3-4.

At operation 512, the CPU may encrypt the second copy of the BIOS policy change prior to transmitting to the controller with access to the second memory. In another implementation, the CPU may transmit the second copy of the BIOS policy change and the controller may encrypt the second copy of the BIOS policy change prior to placing the second copy into the second memory. Encrypting the copy of the BIOS policy change provides an additional level of security to the second memory to prevent tampering to the BIOS policies.

At operation 514, the CPU may transmit the second copy of the BIOS policy change to a controller which has access to the second memory. Prior to placing in the second memory, the second copy of the BIOS policy change is encrypted. The second memory is electrically isolated from the CPU, so the CPU transmits the second copy to a component which may have access to the second memory. In this implementation, a controller may receive the second copy from the CPU and encrypt the second copy prior to placing in the second memory. The second memory serves as a backup of BIOS code and/or policies in case the first memory experiences an attack and/or tampering. Operation 514 may be similar in functionality to operations 312 and 404 as in FIGS. 3-4.

At operation 516, the CPU may initiate execution of the BIOS code and/or policies from the first memory. In implementations, the CPU may execute the BIOS code prior to receiving the BIOS policy change. In these implementations, the CPU may simultaneous execute operations 502-516 while also executing the BIOS code. In other implementations, the CPU may receive the BIOS policy change and authorize the change prior to initiating the execution of the BIOS from the first memory as illustrated in FIG. 4. Operation 516 may be similar in functionality to operation 408 as in FIG. 4.

Figure 6:
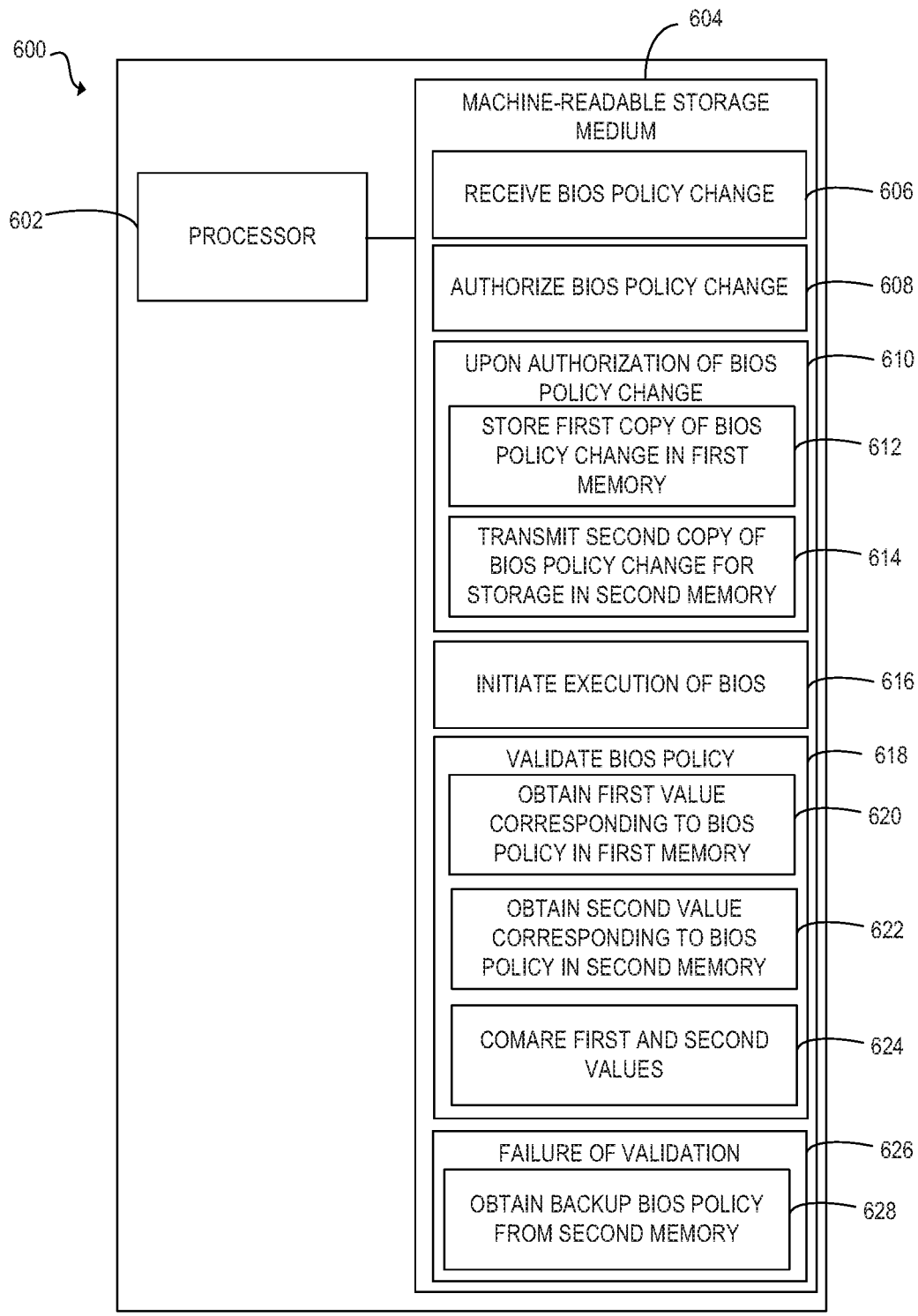
FIG. 6 is a block diagram of an example computing device with a processor to execute instructions in a machine-readable storage medium for authorizing a BIOS policy change for storage in a first memory and a second memory and also validating a BIOS policy through a comparison of values in the first memory and the second memory.

FIG. 6 is a block diagram of a computing device 600 with a processor 602 to execute instructions 606-628 with a machine-readable storage medium 604. Specifically, the computing device 600 with the processor 602 is to execute instructions 606-628 for authorizing a BIOS policy change and upon the authorization, store a first copy of the BIOS policy change in a first memory accessible by the processor 602 and transmit a second copy of the BIOS policy change for storage in a second memory isolated from the processor 602. The processor 602 may also execute instructions 606-628 for initiating an execution of BIOS and validating a BIOS policy through a comparison of a first value corresponding to the BIOS policy in the first memory and a second value corresponding to the BIOS policy in the second memory. If the validation is successful, the instructions include resuming the execution of the BIOS. If the validation fails, this may indicate the BIOS policy in the first memory is corrupt, thus the instructions may use a backup copy of the BIOS policy in the second memory to replace the BIOS policy in the first memory.

Although the computing device 600 includes processor 602 and machine-readable storage medium 604, it may also include other components that would be suitable to one skilled in the art. For example, the computing device 600 may include the first memory 104 and/or the second memory 116 as in FIG. 1. The computing device 600 is an electronic device with the processor 602 capable of executing instructions 606-628, and as such embodiments of the computing device 600 include a computing device, mobile device, client device, personal computer, desktop computer, laptop, tablet, video game console, or other type of electronic device capable of executing instructions 606-628. The instructions 606-628 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-628 for authorizing the BIOS policy change and validating a BIOS policy in a first memory. In one implementation, the processor 602 executes the instructions 606-614 for authorizing the BIOS policy change. In another implementation, the processor 602 executes the instructions 616-628 prior, simultaneously, or upon executing instructions 606-614 for initiating an execution of BIOS and validation of a BIOS policy. Specifically, the processor 602 executes instructions 606-614 to: receive the BIOS policy change locally from the computing device 600 or from a remote request across a network; authorize the received BIOS policy change through a security mechanism such as a prompt on a screen on the computing device 600, a password, credentials, a keyed-hash message authentication code (HMAC), etc.; and upon authorization of the BIOS policy change, store a first copy of the BIOS policy change in the first memory and transmit a second copy of the BIOS policy change for storage in the second memory. The processor 602 may execute instructions 616-628 to: initiate execution of BIOS; validate a BIOS policy by obtaining a first value corresponding to a BIOS policy in the first memory and obtaining a second value corresponding to a BIOS policy in the second memory; compare the first value and the second values, if the values are similar indicates a successful validation and resumes execution of the BIOS, if the values are dissimilar indicates a corrupts BIOS policy in the first memory and fails the validation instruction; if the BIOS policy fails validation, obtain a backup BIOS policy from the second memory and replace the BIOS policy in the first memory with the backup BIOS policy from the second memory.

The machine-readable storage medium 604 includes instructions 606-628 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

Thus, examples disclosed herein provide a secure mechanism for authorizing a BIOS policy change prior to committing the change into storage. Additionally, the examples provide a validation of a BIOS policy in a memory to detect whether the BIOS policy may be corrupt.

We claim:

1. A method comprising:
   authorizing a computer initialization and testing code change for a computing device;
   storing a first copy of the computer initialization and testing code change in a first memory accessible by a processor; and
   storing a second copy of the computer initialization and testing code change in a second memory electrically isolated from the processor,
   wherein the computer initialization and testing code comprise at least one of a boot order of the computer initialization and testing, hardware configurations of the computing device, a computer initialization and testing security mechanism, and modifications thereof.

2. The method of claim 1, comprising:
   encrypting the second copy of the computer initialization and testing code change prior to storage in the second memory; and
   storing the encrypted second copy of the computer initialization and testing code change in the second memory.

3. The method of claim 1, comprising:
   initiating a boot sequence of the computer initialization and testing; and
   validating a computer initialization and testing code by comparing a first value corresponding to the computer initialization and testing code in the first memory and a second value corresponding to the computer initialization and testing code in the second memory.

4. The method of claim 3, wherein upon determining that the first value and the second value are dissimilar, the dissimilarity indicating a failure of the validation of the computer initialization and testing code in the first memory, the method comprises:
   obtaining a backup of the computer initialization and testing code from the second memory; and
   replacing the computer initialization and testing code in the first memory with the backup of the computer initialization and testing code from the second memory.

5. The method of claim 1, wherein when the computer initialization and testing code change fails the authorization, the computer initialization and testing code change is not stored in the first memory or the second memory.

6. The method of claim 1, wherein the second memory serves as a backup of the computer initialization and testing in the first memory.

7. The method of claim 1, wherein when the first value and the second value are similar, the similarity indicates a success of the validation of the computer initialization and testing code in the first memory, the method comprises continuing with a boot sequence of the computer initialization and testing.

8. A non-transitory computer-readable storage medium comprising instructions that when executed by a processor cause a computing device to:
   initiate execution of a boot sequence for a computer initialization and testing;
   validate a computer initialization and testing code in a first memory accessible by the processor; and
   when the validation the computer initialization and testing code fails, obtain a backup of the computer initialization and testing code from a second memory electrically isolated from the processor for restoring the computer initialization and testing code in the first memory with the backup of the computer initialization and testing code from the second memory,
   wherein the computer initialization and testing code comprises at least one of a boot order of the computer initialization and testing, hardware configurations, and a computer initialization and testing security mechanism.

9. The non-transitory computer-readable storage medium including the instructions of claim 8, wherein the validation of the computer initialization and testing code in the first memory includes instructions that when executed by the processor cause the computing device to continue the execution of the computer initialization and testing.

10. The non-transitory computer-readable storage medium including the instructions of claim 8, wherein the validation of the computer initialization and testing code in the first memory includes instructions that when executed by the processor cause the computing device to:
   obtain a first value corresponding to the computer initialization and testing code in the first memory accessible by the processor;
   obtain a second value corresponding to the backup computer initialization and testing code in the second memory electrically isolated by the processor; and
   compare the first value and the second value for the validation of the computer initialization and testing code in the first memory, wherein the first value and the second value being dissimilar indicates a failure of the validation the computer initialization and testing code in the first memory.

11. The non-transitory computer-readable storage medium including the instructions of claim 8, and including instructions that when executed by the processor causes the computing device to:
   receive a computer initialization and testing code change corresponding to a computer initialization and testing code;
   authorize the computer initialization and testing code change;
   upon the authorization of the computer initialization and testing code change, store a first copy of the computer initialization and testing code change in the first memory accessible by the processor; and
   transmit a second copy of the computer initialization and testing code change for storage in the second memory electrically isolated from the processor,
   wherein the computer initialization and testing code change comprises a modification to the at least one of a boot order of the computer initialization and testing, hardware configurations, and a computer initialization and testing security mechanism.

12. The non-transitory computer-readable storage medium including the instructions of claim 8, wherein the computer initialization and testing code comprises modifications of at least one of the boot order of the computer initialization and testing, the hardware configurations, and the computer initialization and testing security mechanism.

13. A computing device comprising:
   a processor to execute a boot sequence of a computer initialization and testing stored in a first memory for authorization of a computer initialization and testing code change, wherein the first memory is accessible by the processor to store a first copy of the computer initialization and testing code change upon authorization of the computer initialization and testing code change; and
   a second memory electrically isolated from the processor to store a second copy of the authorized computer initialization and testing code change,
   wherein the computer initialization and testing code comprises at least one of a boot order of the computer initialization and testing, hardware configurations, a computer initialization and testing security mechanism.

14. The computing device of claim 13, comprising a controller to:
   receive the second copy of the computer initialization and testing code change; and
   store the second copy of the computer initialization and testing code change to the second memory, wherein the second memory is accessible by the controller.

15. The computing device of claim 13, wherein the processor is to:
   upon the execution of the boot sequence of the computer initialization and testing, validate a computer initialization and testing code corresponding to the computer initialization and testing code change at the first memory;
   upon the validation of the computer initialization and testing code, continue the execution of the boot sequence of the computer initialization and testing, wherein the second memory serves as a backup computer initialization and testing code to an invalidated computer initialization and testing code.

16. The computing device of claim 15, wherein for the validation of the computer initialization and testing code corresponding to the computer initialization and testing code change in the first memory, the processor is to:
   obtain a first value corresponding to the computer initialization and testing code in the first memory;
   obtain a second value corresponding to the computer initialization and testing code in the second memory; and
   compare the first value and the second value for validation of the computer initialization and testing code, wherein the first value and the second value being dissimilar indicates a failure of the computer initialization and testing code.

17. The computing device of claim 13, wherein the processor is to:
   encrypt the second copy of the computer initialization and testing code change upon authorization; and
   store the encrypted second copy of the computer initialization and testing code change in the second memory.

18. The computing device of claim 13, wherein the computer initialization and testing code comprises modifications of at least one of the boot order of the computer initialization and testing, the hardware configurations, and the computer initialization and testing security mechanism.

19. The computing device of claim 13, wherein the computer initialization and testing code in the second memory corresponds to the computer initialization and testing in the first memory.

20. The computing device of claim 13, wherein the computer initialization and testing code comprises any of computer start-up instructions, computer bootstrap code, and a computer operating system.

* * * * *